United States Patent [19]

Pearson

[11] 4,038,132

[45] July 26, 1977

[54] NUCLEAR REACTORS

[75] Inventor: Kenneth George Pearson, Weymouth, England

[73] Assignee: United Kingdom Atomic Energy Authority, London, England

[21] Appl. No.: 605,243

[22] Filed: Aug. 18, 1975

[30] Foreign Application Priority Data

Sept. 17, 1974 United Kingdom ............... 40472/74

[51] Int. Cl.² ............................................. G21C 15/18
[52] U.S. Cl. ....................................... 176/38; 176/76; 176/78
[58] Field of Search ............................. 176/37, 38, 78

[56] References Cited

U.S. PATENT DOCUMENTS

| | | | |
|---|---|---|---|
| 3,346,459 | 10/1967 | Prince et al. | 176/37 |
| 3,356,582 | 12/1967 | Saunders | 176/78 |
| 3,390,053 | 6/1968 | Tarasuk et al. | 176/78 |
| 3,749,640 | 7/1973 | Israel | 176/78 |
| 3,772,148 | 11/1973 | Seddon | 176/78 |
| 3,844,888 | 10/1974 | Calvin | 176/78 |
| 3,862,000 | 1/1975 | Pugh et al. | 176/78 |

FOREIGN PATENT DOCUMENTS

| | | | |
|---|---|---|---|
| 1,104,082 | 4/1961 | Germany | 176/78 |
| 291,909 | 5/1967 | United Kingdom | 176/37 |
| 1,095,545 | 12/1967 | United Kingdom | 176/78 |

Primary Examiner—Verlin R. Pendegrass
Assistant Examiner—Ralph Palo
Attorney, Agent, or Firm—Larson, Taylor and Hinds

[57] ABSTRACT

In a nuclear fuel rod cluster in which the rods are supported axes parallel and held in spaced relationship by transverse grids, a number of auxiliary coolant spray pipes are positioned amongst the fuel rods. At least one grid has attached to it a target plate which extends between the fuel rods to deflect auxiliary coolant sprays on to the surfaces of portions of the rods which would otherwise not be cooled by the spray.

4 Claims, 5 Drawing Figures

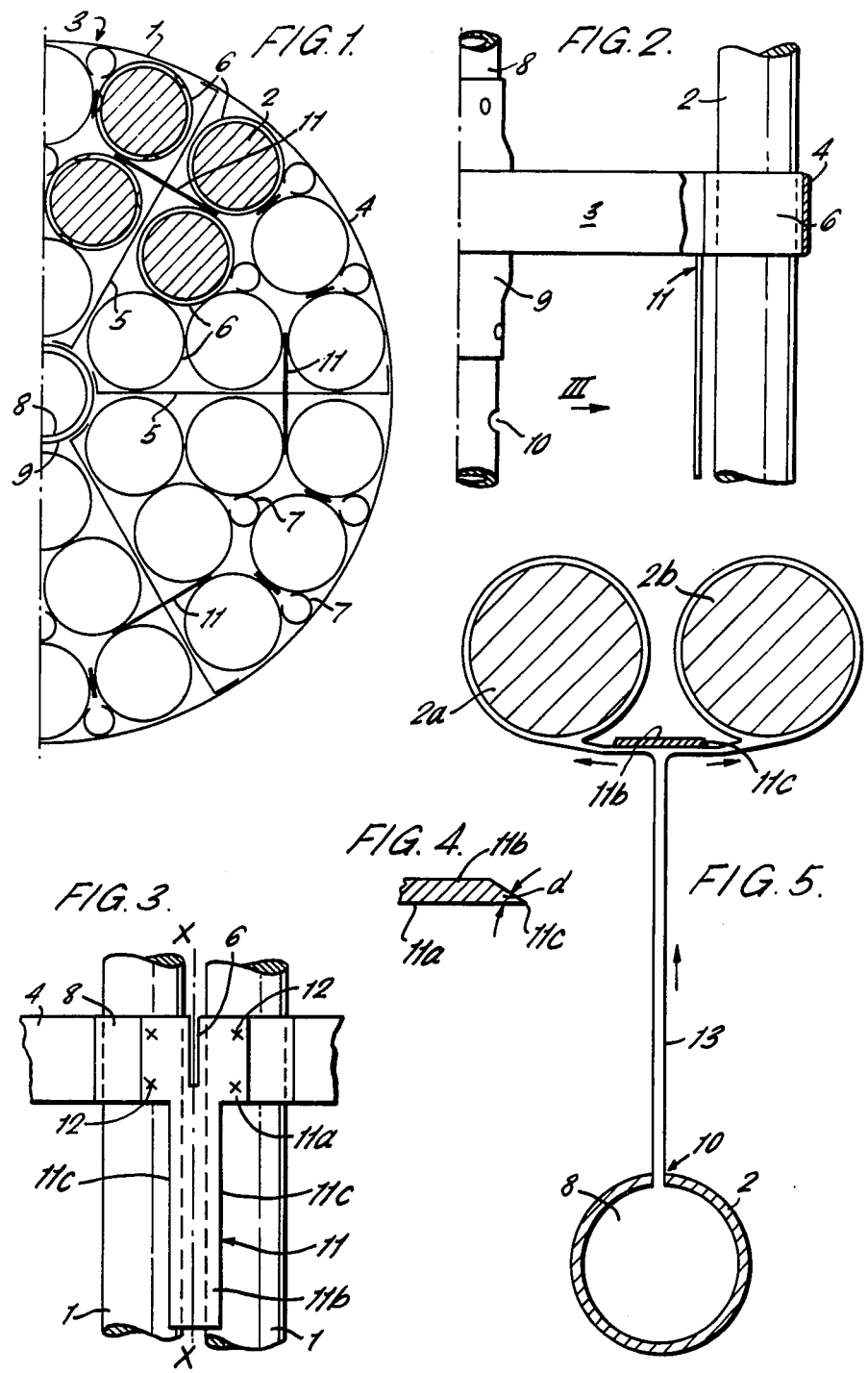

NUCLEAR REACTORS

BACKGROUND OF THE INVENTION

This invention relates to nuclear reactors and nuclear fuel elements for use in nuclear reactors cooled by light or heavy water.

The fuel elements for these reactors commonly comprise nuclear fuel rods supported in parallel spaced apart positions in suitably proportioned clusters or bundles so that within the nuclear reactor core, coolant passed over the fuel rods in a direction parallel to their surfaces becomes heated. Thereafter the heated coolant is employed in a heat utilisation plant for example a heat exchanger or a steam turbine.

Various proposals have been made for providing an auxiliary means of cooling the nuclear fuel clusters by means of one or more spray cooling tubes which, connected to their own supply of coolant extend within the cluster parallel with the rods, and from holes in the side walls of these tubes, coolant water may be sprayed laterally into the cluster against the rods. The flow of main coolant may thus be supplemented by the auxiliary coolant or replaced by the auxiliary coolant in some circumstances.

A difficulty in these arrangements is that only those fuel rods close to a spray cooling tube have a line of sight to it and can readily be reached by the auxiliary coolant.

SUMMARY OF THE INVENTION

According to the present invention a nuclear fuel element comprising a cluster of nuclear fuel rods supported axes parallel in spaced apart relationship by transverse grids so as to define interspaces for the axial flow of reactor coolant has at least one of the interspaces occupied in part by an axially extending auxiliary coolant conduit with lateral holes through which auxiliary coolant is sprayed into the cluster and deflector means extending from a transverse grid into a position in front of the holes for deflecting auxiliary coolant spray on to parts of the fuel rods inaccessible to auxiliary coolant. The deflecting means preferably include target plates secured to a grid and dependent therefrom into the trajectory of one or more jets of auxiliary coolant emitted from the lateral holes in the conduit. If, as is usual, the fuel rods are disposed axes vertical, in rows on a uniform pitch then the face of the target plate directed towards the auxiliary coolant conduit is bounded by two longitudinal edges spaced by a distance substantially equivalent to the pitch of the fuel rods. When pitched on concentric circles about a central auxiliary coolant conduit the target plate is preferably so disposed that its vertical centre line lies in plane passing through a mid pitch position. If the edges of the target plate are made sharp then there is a well defined deflection of auxiliary coolant and preferably the vertical longitudinal edges of the target plate make acute angles with the face of the plate which is directed towards the auxiliary coolant conduit.

DESCRIPTION OF THE DRAWINGS

In order that the invention may be better understood one embodiment will now be described by way of example with reference to the accompanying diagrammatic drawings in which FIG. 1 is one half of a nuclear fuel element in plan view, FIG. 2 is a side elevation of FIG. 1 with most of the fuel rods omitted;

FIG. 3 is a view in the direction of the arrow III in FIG. 2,

FIG. 4 is an enlarged view of part of the target plate in the cross-section shown in FIG. 5 and FIG. 5 is a diagram showing the effect of the invention.

DESCRIPTION OF THE PREFERRED EMBODIMENT

FIG. 1 is indicative of one half of a 36 nuclear fuel element designed for use in a Pressure Tube Nuclear Reactor and comprising a cluster of nuclear fuel rods 2 supported, axes parallel in spaced apart relationship by transverse grids. One such grid is shown at 3 and this comprises an outer band 4 joined at 60° intervals by webs 5 which divides the space bounded by the band into six sectors each of which contains six fuel rod positioning ferrules 6. The ferrules 6 are welded together at their points of contact and with the webs 5. Correct positioning of the ferrules is assisted by C shaped spacers 7. The ferrules 6 receive the fuel rods 1 and together with end fittings (not shown) maintain them in spaced apart relationship, axes vertical and parallel to one another so defining interspaces between them through which a main coolant may be passed to remove heat from the fuel. In one of these interspaces an auxiliary coolant conduit 8 is located extending through and fixed to a central ferrule 9 to which the radially inner ends of the webs 5 are secured. The conduit 8 is closed at one, lower, end and has a number of lateral holes 10 in its wall so that when the conduit 8 is connected at its other end to a source of auxilary coolant, the latter will emerge as a plurality of sprays directed transversely into the cluster of fuel rods at right angles to the flow direction of main coolant. This spray cooling facility is useful as an alternative or supplementary cooling to an axial flow of main coolant through the cluster from one end to the other.

All the parts of the fuel cluster so far described are part of the prior art and do not of themselves form part of the invention. From the foregoing it will be understood that those fuel rods which do not lie in a line of sight with the holes 10 in the conduit 8 will be less effectively cooled by auxiliary coolant than those which do. In order to ameliorate the cooling of these fuel rods by auxiliary coolant, means are provided for modifying the direction of the jet of auxiliary coolant after injection into the cluster to deflect coolant on to the surfaces of fuel rods otherwise inaccessible to auxiliary coolant. Said means comprises a number of T-shaped target plates 11 attached by their cross pieces 11a to adjacent ferrules 6 by welds 12 and slotted to clear the adjacent radial web 5. Each stem 11b of the target plates 11 lie in the line of sight from one or more holes 10 in the conduit 8 and have a face directed, towards the conduit. This face is bounded by longitudinal edges 11c separated by a distance w equivalent to approx half the pitch of the fuel rods. The edges 11c of the cross piece are sharply defined; the edge surfaces making an acute angle $\alpha$ in FIG. 4 of preferably 60°, with the face of the target plate 11 (FIG. 4). In addition the target plates 11 are positioned so that the vertical centre line X—X (FIG. 3) through the face 11b of the plate directed towards the conduit lies in a plane passing through the said mid-pitch portion.

In operation the nuclear fuel rods are normally adequately cooled by a flow of main coolant axially through the interspaces between the fuel rods. When auxiliary cooling is required, auxiliary coolant is injected transversely into the cluster via holes 10 in the conduits. In order to ensure that auxiliary coolant has access to wet rods in the outer row which are out of the line of sight of the auxiliary coolant jets, target places 11 depend from the grid so as to deflect a jet 13 from holes as at 10 on to parts of the surfaces of rods 2a, 2b which, being partially masked by other rods, may not otherwise be properly wetted by auxiliary coolant. It is important to provide sharp edges on the target plates 11 so that the jet 13 of auxiliary coolant water is deflected and properly spills off the target plate to envelope the adjacent pair of fuel rods 2a, 2b as shown in FIG. 5. The target plates need not be flat but are preferably made flat and as such are virtually unsensitive to any misalignment that may exist between the jet of auxiliary coolant and the larger plate which may set in after operation, say by the holes 10 becoming partially blocked.

We claim:

1. A nuclear fuel element comprising a cluster of nuclear fuel rods supported axes parallel in spaced apart relationship by transverse grids so as to define interspaces for the axial flow of coolant and having at least one of the interspaces occupied by an axially extending auxiliary coolant conduit with lateral holes through which auxiliary coolant is sprayed into the cluster and including deflection means extending from a transverse grid and located in a position in front of the holes for deflecting coolant spray onto parts of the fuel rods inaccessible to auxiliary coolant, and the deflecting means are constituted by a target plate secured to a grid and with a face of the plate positioned in the trajectory of one or more jets of auxiliary coolant from the auxiliary coolant conduit, and the target plate depends vertically from a grid between two rows of nuclear fuel rods, the rods in each row being spaced at a uniform pitch, said face of the target plate being directed towards the auxiliary coolant conduit, said face being bounded by two parallel longitudinal edges which are separated by a width of plate substantially equivalent in distance to half the pitch of the nuclear fuel rods.

2. A nuclear fuel element as claimed in claim 1 in which the nuclear fuel rods are pitched on concentric circles about a central auxiliary coolant conduit and the target plate is so disposed that its vertical centre line lies in a plane passes through a mid-pitch position between fuel rods on to which auxiliary coolant is deflected.

3. A nuclear fuel element as claimed in claim 1 in which the planes containing the faces of the longitudinal edges of the target plate intersect the face of the target plate which is directed to the auxiliary coolant conduit at acute angles.

4. A nuclear fuel element as claimed in claim 3 in which each acute angle is about 60°.

* * * * *